US012774433B2

(12) United States Patent
Byers et al.

(10) Patent No.: US 12,774,433 B2
(45) Date of Patent: Oct. 27, 2026

(54) ZERO WASTE SOAP CONTAINER

(71) Applicants: Andre Byers, Washington, DC (US); Nya Byers, Washington, DC (US); Zuri Byers, Washington, DC (US)

(72) Inventors: Andre Byers, Washington, DC (US); Nya Byers, Washington, DC (US); Zuri Byers, Washington, DC (US)

( * ) Notice: Subject to any disclaimer, the term of this patent is extended or adjusted under 35 U.S.C. 154(b) by 647 days.

(21) Appl. No.: 18/193,802

(22) Filed: Mar. 31, 2023

(65) Prior Publication Data

US 2023/0313082 A1 Oct. 5, 2023

Related U.S. Application Data

(60) Provisional application No. 63/327,300, filed on Apr. 4, 2022.

(51) Int. Cl.

*A61K 8/00* (2006.01)
*B65D 65/00* (2006.01)
*B65D 65/46* (2006.01)
*C11D 1/04* (2006.01)
*C11D 9/26* (2006.01)
*C11D 13/16* (2006.01)
*C11D 17/04* (2006.01)

(52) U.S. Cl.

CPC ............ *C11D 9/267* (2013.01); *B65D 65/466* (2013.01); *C11D 1/04* (2013.01); *C11D 13/16* (2013.01); *C11D 17/04* (2013.01)

(58) Field of Classification Search

None

See application file for complete search history.

(56) References Cited

U.S. PATENT DOCUMENTS 4,251,383 A * 2/1981 Kemp .................. C11D 3/2093 510/513
4,812,253 A * 3/1989 Small ..................... A61K 8/361 510/153
8,324,142 B1 * 12/2012 Snyder ..................... C11D 9/00 510/144
2016/0089325 A1 * 3/2016 Perkins .................. A61K 8/922 424/769

FOREIGN PATENT DOCUMENTS

EP 2189080 A2 * 5/2010 ............... A61Q 1/10

* cited by examiner

*Primary Examiner* — Necholus Ogden, Jr.

(74) *Attorney, Agent, or Firm* — Howard University School of Law; Lyssa-Michelle Morris

(57) ABSTRACT

A composition of materials provides an article of manufacture in the form of a soap container. The composition of materials of the soap container can provide a biodegradable soap product to reduce environmental waste. A composition developed of soap provides a container to hold soap products, body lotion, and body creams. A container of soap to can be broken off and used as a soap product itself with break-line indentations.

15 Claims, 10 Drawing Sheets

| COMPOSITION 100 | PERCENT BY VOLUME |
|---|---|
| Coconut Oil | 41% |
| Sunflower Oil | 16% |
| Olive Oil | 3% |
| Sodium Hydroxide | 13% |
| Distilled Water | 27% |
| Total | 100% |

| COMPOSITION 100 | PERCENT BY VOLUME |
|---|---|
| Coconut Oil | 41% |
| Sunflower Oil | 16% |
| Olive Oil | 3% |
| Sodium Hydroxide | 13% |
| Distilled Water | 27% |
| Total | 100% |

FIGURE 1

| COMPOSITION 100' | PERCENT BY VOLUME |
|---|---|
| Coconut Oil | 33% |
| Sunflower Oil | 20% |
| Olive Oil | 13% |
| Sodium Hydroxide | 10% |
| Distilled Water | 22% |
| Total | 100% |

FIGURE 2

ZERO WASTE SOAP CONTAINER

CROSS-REFERENCE TO RELATED APPLICATIONS

This application claims priority to provisional application App. No. 63/327,300 filed Apr. 4, 2022 the contents are incorporated by references herein.

FIELD

The present disclosure generally relates to a container composition, and particularly relates to a biodegradable container made of soap to store cosmetic and hygiene products.

BACKGROUND

In recent years, the public has become more environmentally conscious; however, plastic waste is still a great social issue. Plastic packaging for personal care and beauty products makes up a significant portion of the rigid plastic produced in the United States each year. Packaging made from #1 and #2 plastics can be recycled but many of the containers used for personal care and beauty products are made with non-recyclable plastics. However, only a fraction of plastics that are recyclable is actually recycled. Consumers are constantly rebuying the same personal care products after finishing a product and throwing away their old containers, creating an excess of plastics that are not recycled and end up in landfills, littered, or incinerated.

The majority of plastic containers end up in landfills or are littered, where the plastic eventually breaks down into microscopic particles. These particles, known as "microplastics," are not only bad for the environment but also bad for individuals' health. Microplastics contaminate our food, air, and water, and also accumulate in our bodies. Once microplastics are accumulated in an individual's body, there is an increased risk of that individual experiencing chronic inflammation or other illnesses. Plastic production continues to increase regardless of the environmental and health risks. Current biodegradable containers for personal care are not 100% zero waste or limit what can be held within the container to only liquids.

SUMMARY

The following summary presents a simplified summary of certain features. The summary is not an extensive overview and is not intended to identify key or critical elements.

In accordance with the teachings of the present disclosure, a composition of materials composes an article of manufacture in the form of a soap container. In accordance with the teachings of the present disclosure, the composition of materials of the soap container can provide a biodegradable product to reduce environmental waste.

An aspect of the present disclosure provides a composition developed of soap to provide as a container to hold soap products, body lotion, and body creams.

An aspect of the present disclosure provides a composition developed of soap to be biodegradable given that the container itself can be broken off and used as a soap product itself. An aspect of the present disclosure includes a sidewall of the container having vertical break-line indentations. An aspect of the present disclosure includes a sidewall of the container having vertical inclined break-line indentations. In yet another aspect, the sidewall of the container body includes a circumferential break-line indentation. In yet another aspect, the circumferential break-line indentation intersects with at least one of the vertical break-line indentations. In yet another aspect, the sidewall of the container body includes a perimeter break-line indentation. In yet another aspect, the perimeter break-line indentation intersects with at least one of the vertical break-line indentations.

Another aspect of the present disclosure provides an alternative to plastic and silicone soap containers by providing a zero-waste option.

Another aspect of the present disclosure provides "zero-waste" environmentally suitable container in which the composition may comprise coconut oil, sunflower oil, olive oil, sodium hydroxide, and distilled water.

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIGS. 1 and 2 shows tables of the natural ingredients and their ratios to make the soap container and its lid according to certain aspects of the present disclosure.

DETAILED DESCRIPTION

Figure 3:
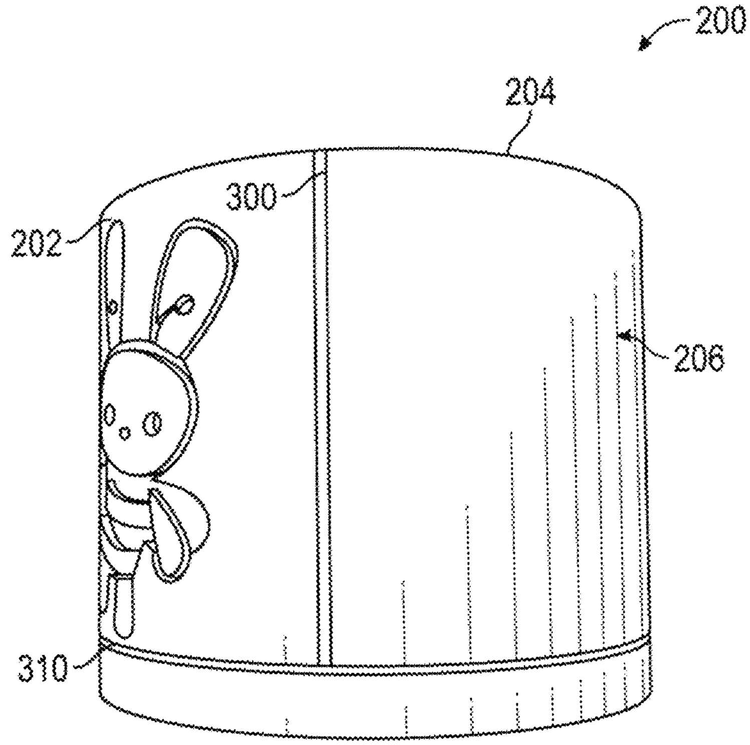
FIGS. 3 through 6 illustrate a soap container construction and its lid according to certain aspects of the present disclosure.

The features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings.

The present specification as well as various commercial and consumer products may provide an alternative to plastic and silicone containers by providing a zero-waste container option for the user. The container itself may comprise a combination of coconut, olive, and sunflower oil, that is poured into a prepared mold to into the desired shape.

Terms of degree such as “generally”, “substantially”, “about” and “approximately” as used herein mean a reasonable amount of deviation of the modified term such that the end result is not significantly changed. For example, these terms can be construed as including a deviation of at least +–0.5% of the modified term if this deviation would not negate the meaning of the word it modifies.

The following example will illustrate a method of preparing a compound in accordance with the present disclosure. As an example of the use of these materials a composition 100 is particularly suitable for use as a biodegradable container shown in FIGS. 3 and 4 may be manufactured as follows. In accordance with the teachings of the present disclosure, a composition of materials may be formed to create a molded soap container. In accordance with the teachings of the present disclosure, the composition of materials of the soap container can provide a biodegradable soap container to reduce environmental waste. An aspect of the present disclosure is to provide a composition developed of a solid soap to provide as a container to hold liquid soap products, body lotion, and body creams.

As used herein, a CAS Registry Number (also referred to CAS Number) is a unique identification number assigned by the Chemical Abstracts Service (CAS), US to chemical substance described in the open scientific literature. CAS Registry Numbers can be convenient for database searches. They offer a reliable, common and international link to every specific substance across the various nomenclatures and disciplines used by branches of science, industry, and regulatory bodies. Almost all molecule databases today allow searching by CAS Registry Number.

FIG. 1 shows a table of composition 100 of ingredients provide as a container to hold soap products, body lotion, and body creams and the like. Composition 100 can provide “zero-waste” environmentally suitable container in which the composition may comprise coconut oil (CAS No. 8001-31-8), sunflower oil (CAS No. 8001-21-6), olive oil (CAS No. 8001-25-0), sodium hydroxide (CAS No. 1310-73-2), and distilled water. In accordance with teachings of the present disclosure, composition 100 includes essentially about 40-42 percent by volume coconut oil, essentially about 15-17 percent by volume sunflower oil, essentially about 2-4 percent by volume olive oil, essentially about 12-14 percent by sodium hydroxide, and essentially about 26-28 percent by volume distilled water (CAS No. 7732-18-5).

In one formulation, the composition 100 used to form the container is made out of approximately 33% coconut oil, 20% olive oil, 13% sunflower oil, 10% sodium hydroxide, and 22% water by volume. In another formulation shown in FIG. 2, the composition 100' used to form the container is preferably made out of approximately 41% coconut oil, 3% olive oil, 16% sunflower oil, 13% sodium hydroxide, and 27% water by volume. The composition 100 in the present disclosure may be provided in a liquid formulation and then in a solid formulation.

Figure 4:
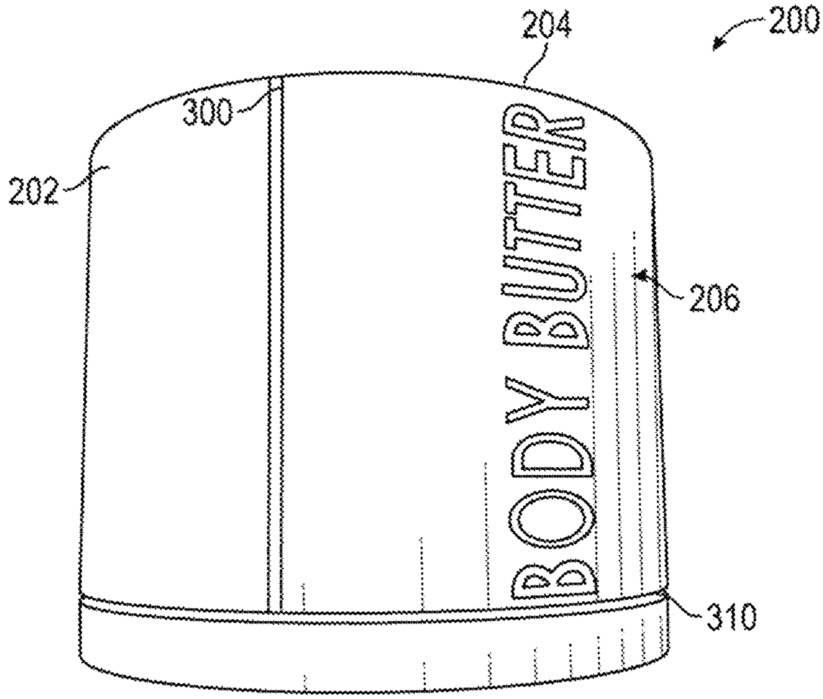
Figure 5:
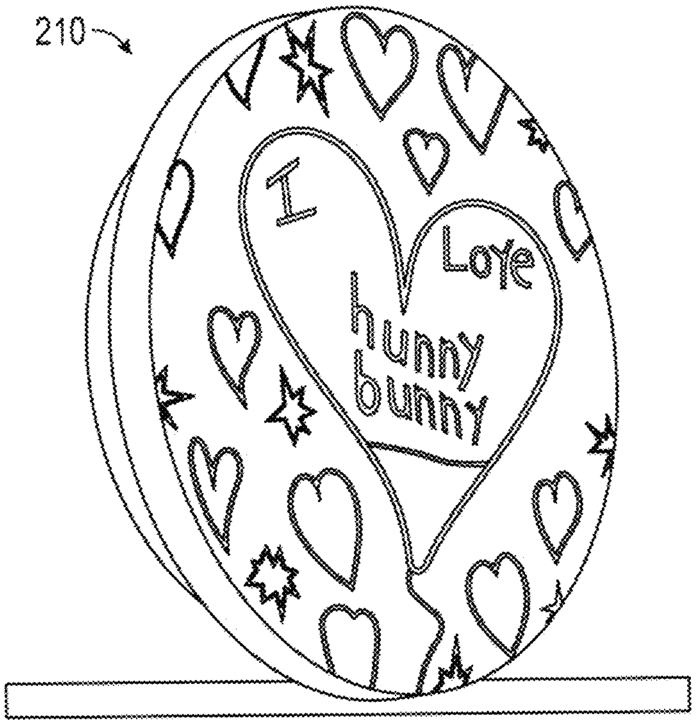
Figure 6:
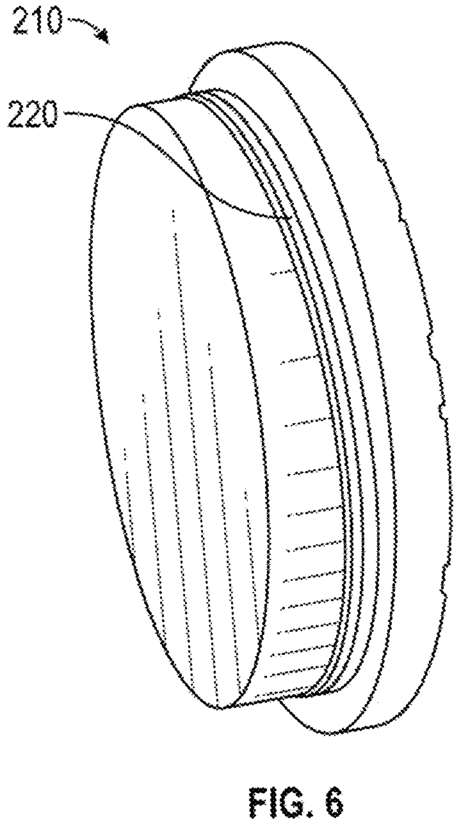

Most preferably, the composition 100, 100' is provided in the form of a solid wall container 200 shown in FIGS. 3 and 4; and top 210 shown in FIGS. 5 and 6 of a substantially uniform and homogenous mixture. The composition 100, 100' has the structural integrity of a solid and therefore can retain a shape and can be molded into a cylindrical container or other shape.

Figure 7:
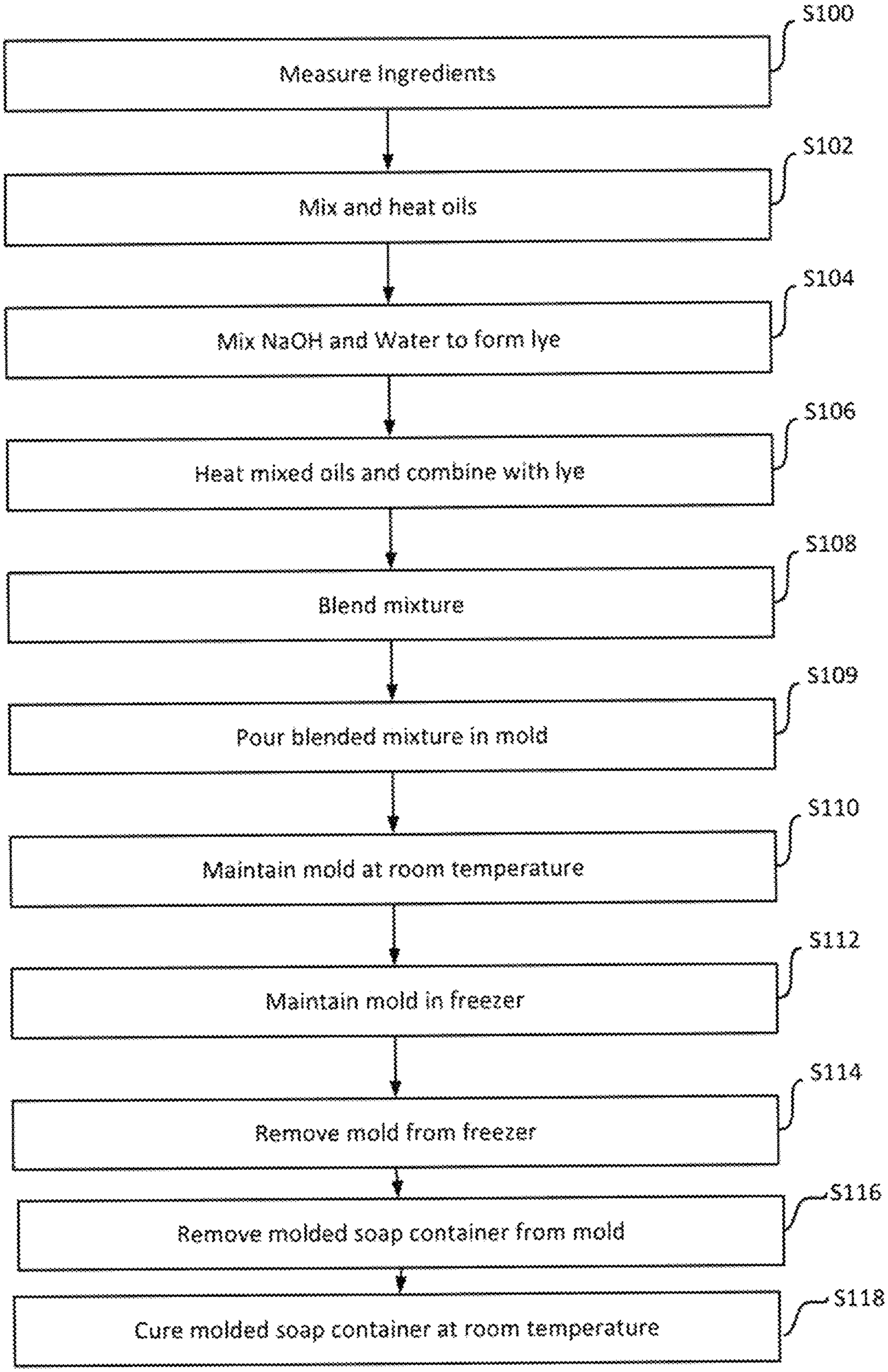
FIG. 7 is a flowchart of a process of making a container according to certain aspects of the present disclosure.

The following example will illustrate a method of preparing this natural compound 100, 100' in accordance with the present disclosure. As an example of the use of these materials a composition 100, 100' particularly suitable for use as a biodegradable container shown in FIG. 3-8 may be made as follows. Referring to FIG. 7, in one method of preparation, in step S100, each oil mixture ingredient is measured using an acceptable method of one skilled and the oil ingredients are placed into a suitable metal container for a subsequent heating process. In particular, the oils, sodium hydroxide, and distilled water are measured based on desired volume of end product using ratios volumes as in discussed in the present disclosure. In step S102, combine measured oils (e.g., coconut oil, sunflower oil, and olive oil) and apply heat (low to medium level if using a stovetop heating apparatus). In step S104, combine the measured sodium hydroxide (e.g., NaOH) and distilled water in a separate container and gently stir the mixture to thoroughly blend the two ingredients. This combined mixture can be referred to as “lye”.

In step S106, when the measured oils in step S102 reach about 110° F., pour the blend of sodium hydroxide and distilled water into the container of heated oils to start a saponification process. It is noted that saponification is a process that involves the conversion of fat, oil, or lipid, into soap and alcohol by the action of aqueous alkali (e.g., NaOH). Soaps are salts of fatty acids, which in turn are carboxylic acids with long carbon chains. In step S108, blend (stick-blend, preferably) the mixture while keeping the mixture heated at about 110° F. for approximately eight 8 minutes or until the oils and lye completely combine, but do not reach the state of “trace”. In step S109, while the newly formed soap-composition is still in a mostly-liquid form, pour it in the custom silicone molds for containers and containers' tops and gently tapping the mold bottom throughout the pouring process to ensure the liquid soap-composition seeps through the entire mold. It is noted that after the initial agitation from stick blending the ingredients (step S108), this method continues the saponification process of the soap composition while in the mold (step S109).

In step S110, allow the soap-composition to “cure” in the mold for an hour at room temperature. In step S112, place molds in a freezer set at 0° F. for eight hours. The molds are placed directly into a freezer for rapid cooling. Of course, the molds could be placed in an appropriate refrigerator system. In step S114, the soap-composition has now formed into a solid structure of soap containers and soap container tops. In step S116, in a room temperature environment, quickly remove the soap containers 200 and tops 210 from the molds, while the soap-composition is still in sold form. In step S118, soap containers 200 and container tops 210 are allowed to further “cure” for two weeks at room temperature. After this two-week cure process, the testing found this oil combination creates one of the hardest and strongest containers when compared to other combinations.

The compositions and methods of the present specification, enables the soap-composition to harden while frozen without being brittle in the solid form. Because removing the soap containers from the molds (Step S116) requires some tugging and bending of the mold itself, the soap container could become damaged in manufacturing. In one example, the soap compositions using oil combinations of the present disclosure provide some pliability to bend without breaking, withstanding the pressures of being bent back into shape due the mold removal process. After this two-week cure process, the testing found the soap compositions using oil combinations of the present disclosure creates one of the hardest and strongest containers when compared to other combinations. Nevertheless, the cure time could be less than two weeks, such as 3, 4, 5 and 7 days or 12 days or longer such as 15, 16 or 17 days.

In one or more constructions according to the teachings of the present disclosure, the composition 100, 100' is provided in the form of a solid wall container 600 and container 800 and lid 810 of a substantially uniform and homogenous mixture. The composition 100, 100' has the structural integrity of a solid and therefore can retain a shape and can be molded into a cylindrical container or other shape.

Figure 11:
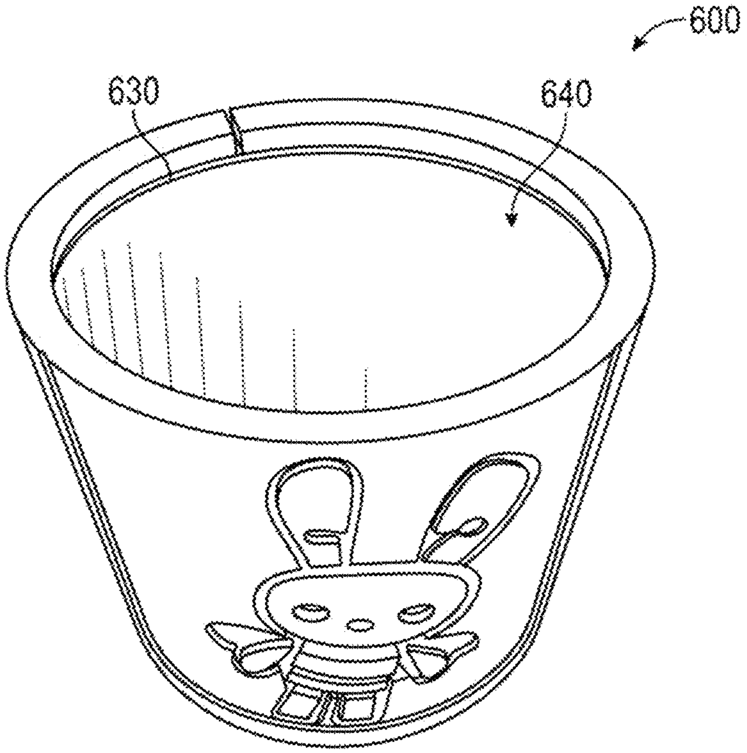
FIGS. 11 and 12 depict a soap container created according to certain aspects of the present disclosure.

In one construction according to the teachings of the present disclosure, the mold designs for the solid soap container includes "break-lines" indentations near the bottom and along the sidewalls thereof. Referring to FIGS. 3, 4 and 11, break-lines indentations 300, 310 are strategically placed to allow a user to easily break apart the solid soap container 200, 600 into useable pieces of soap after depleting the container's contents. Turning to FIGS. 3 and 4, the sidewall 202 of the container body 206 may optionally include vertical break-line indentations 300 extending to the distal top 204. The sidewall 202 of the container body 206 may optionally include a circumferential break-line indentation 310. The circumferential break-line indentation 310 may intersect with at least one of the vertical break-line indentations 300. This construction, including the container top 210 (see FIG. 5), creates four (4) separable useable pieces of soap product for use (e.g, two pieces from the sidewall 202 and one piece from the bottom and the top/lid 210). Nevertheless, the container body 206 may include more than two vertical break-line indentations or more than one circumferential break-line indentation. In this example construction, composition 100, 100' can be biodegradable and the container 200 can be broken off and used as a soap product itself. In one advantage, because the entire container and its top are made of soap, there is no solid waste to clogged the dumps or landfills. There are no metal or plastic levers to throwaway in the landfill. In one advantage, the container is 100% soap that is intended to be used up to prevent disposable in a landfill.

Figure 12:
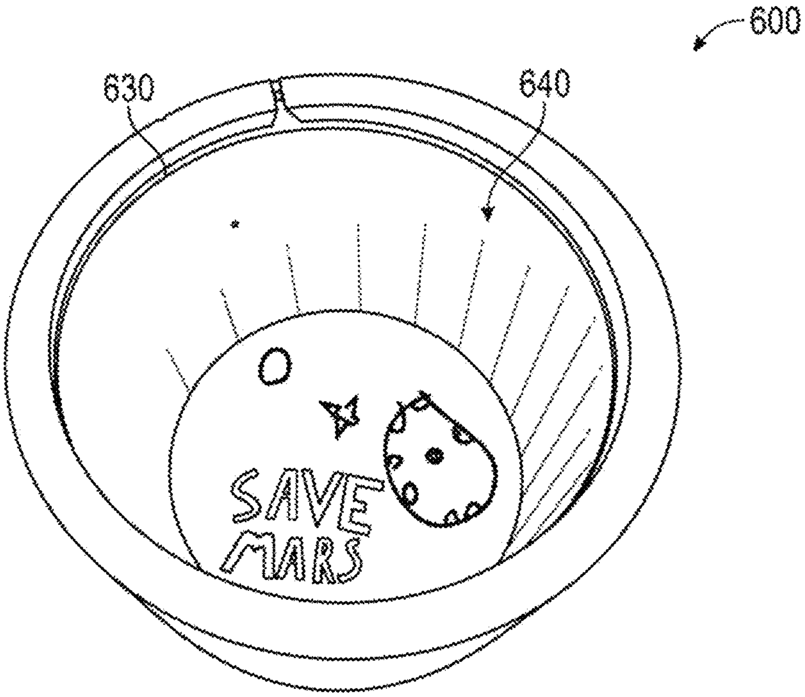
Figure 13:
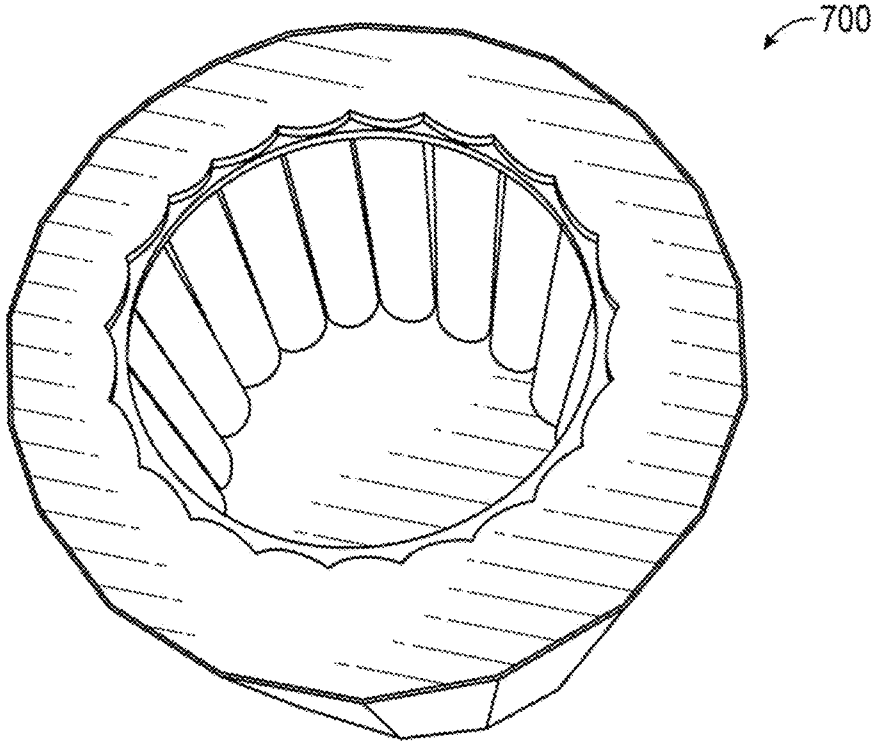
FIG. 13 depicts a silicone mold created from the mold design of FIGS. 9 and 10 according to certain aspects of the present disclosure.

Referring FIG. 6, the container top 210 may includes a male thread 220 to mate inside of the container body 206 with a corresponding indentation (not shown). A corresponding indentation serving as a female receiver part 630 for a container top is shown in FIGS. 11 and 12 for container 600. In this arrangement, a container top may matingly engage into the container body to secure contents (e.g., lotions or semisolid cream) in the cavity 640 of the container 600.

Figure 8:
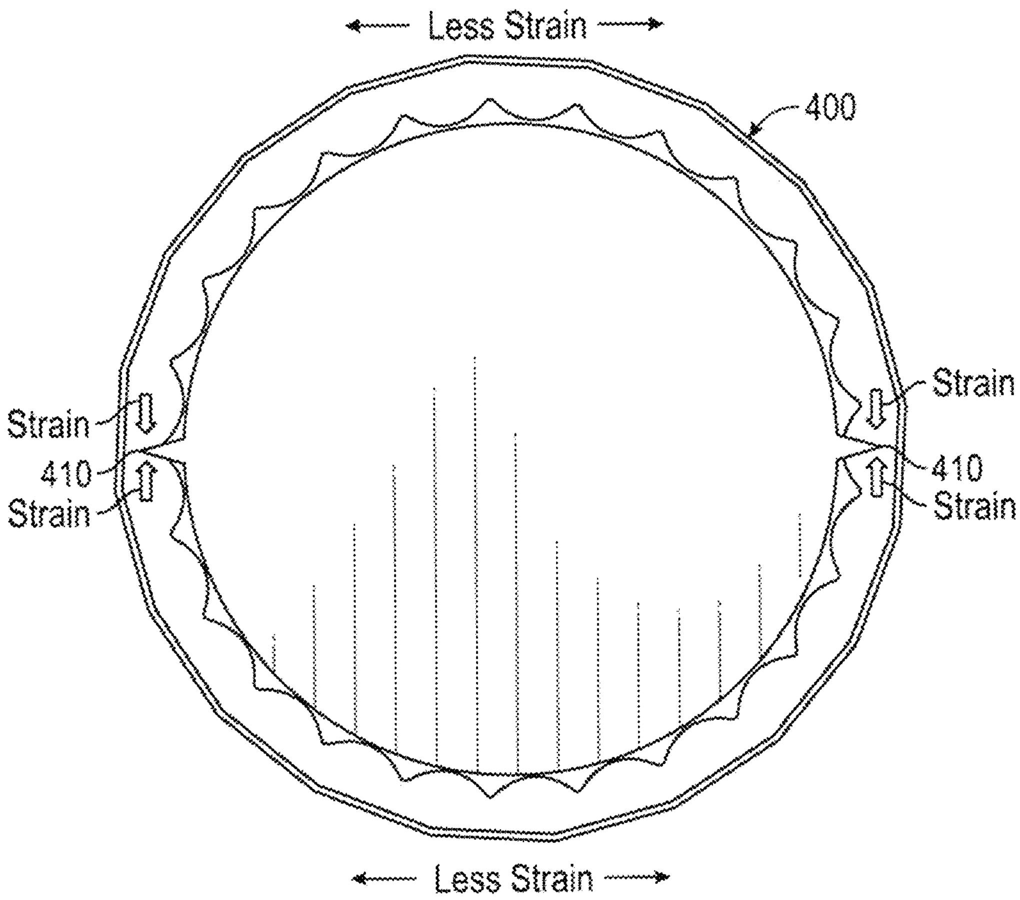
FIG. 8 is a top plan view of a molded soap container the soap containers according to certain aspects of the present disclosure.
Figure 9:
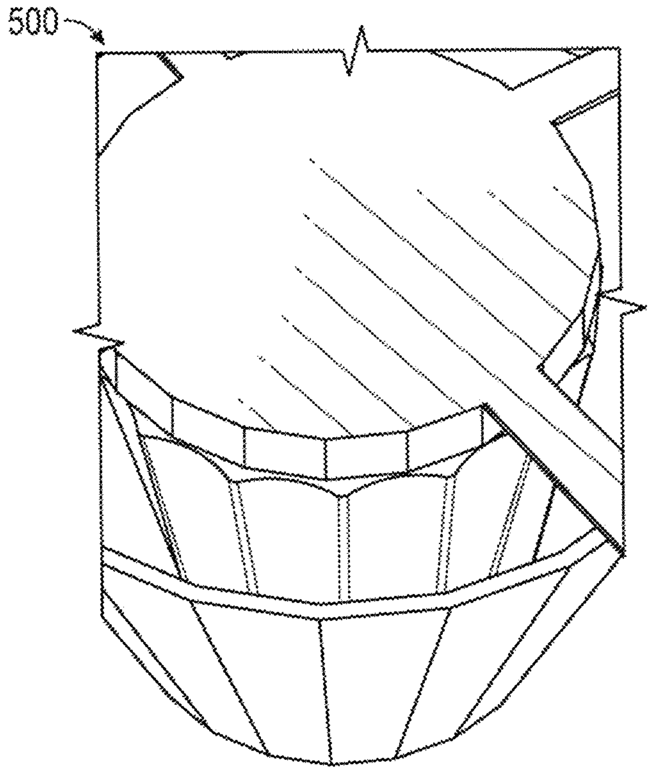
FIG. 9 is an enlarged perspective view of a mold design focusing on the moon shape like grooves distributed around the structure according to certain aspects of the present disclosure.
Figure 10:
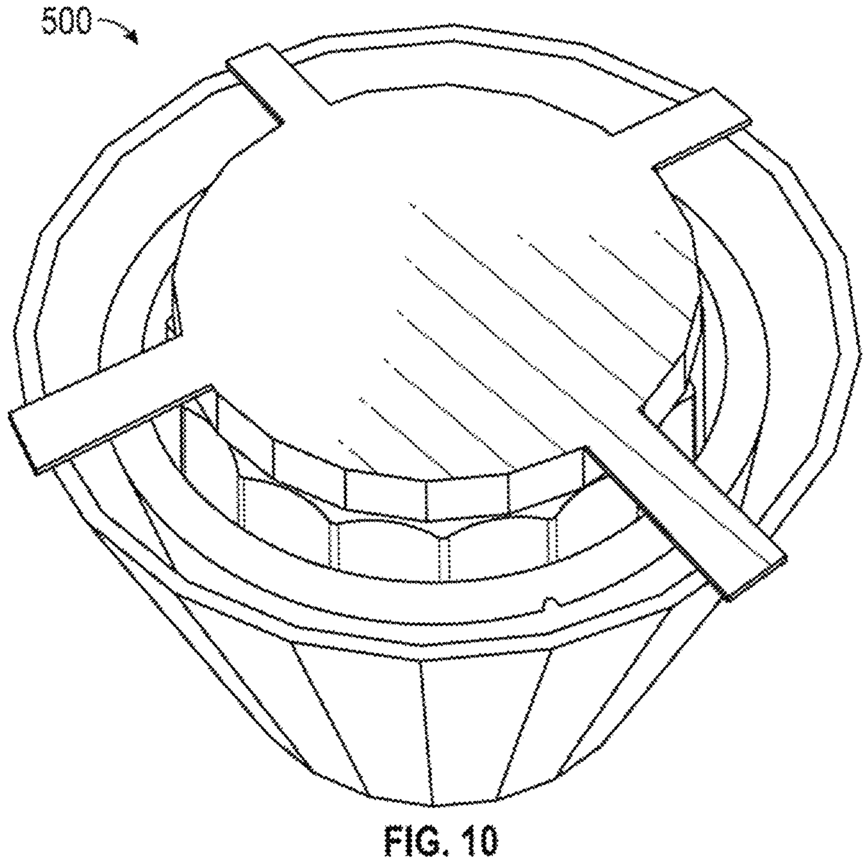
FIG. 10 is a perspective view of the mold design of FIG. 9.

Referring to FIGS. 8, 9, 10 and 13, a circular silicone mold forms less of an oval when squeezed on its ends. Turning to FIG. 8, the inner core of the mold 400 to redistribute the strain when squeezed. By creating triangular strain relief 410 mouths in the design of the mold 400, we were able to redistribute the strain and thus create less of an oval and subsequently eliminate the fractures in the final soap container 600. Silicone mold 700 shown in FIG. 13 was created with mold design 500 shown in FIGS. 9 and 10.

Figure 14:
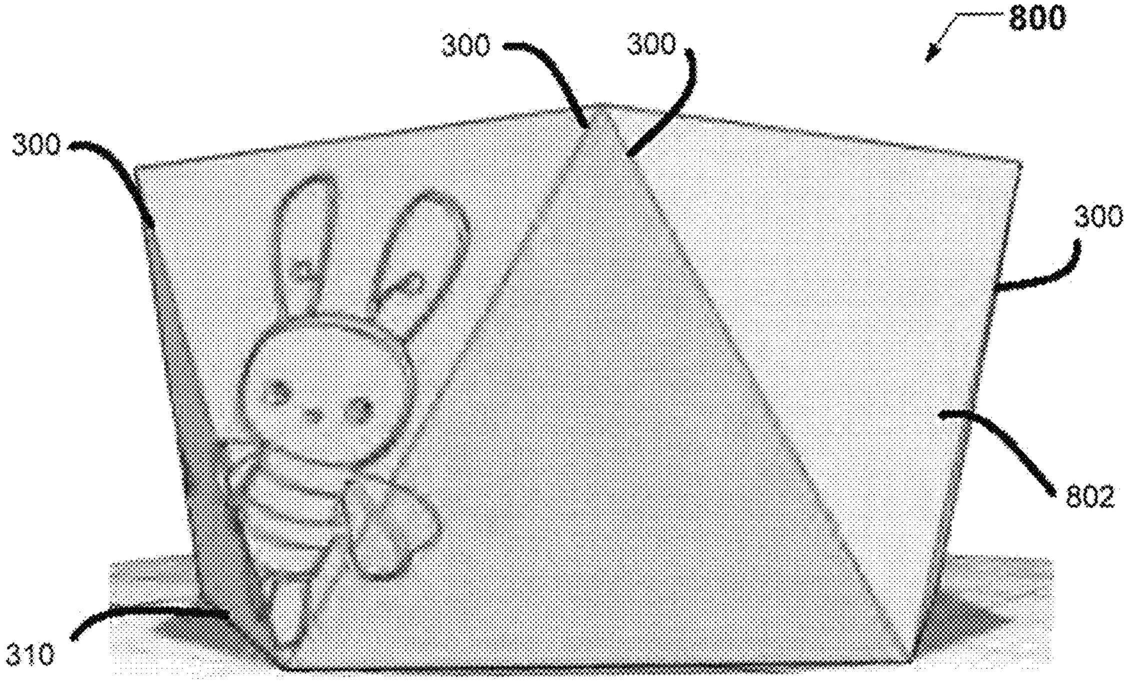
FIGS. 14 and 15 illustrate an alternative construction of soap container according to certain aspects of the present disclosure.
Figure 15:
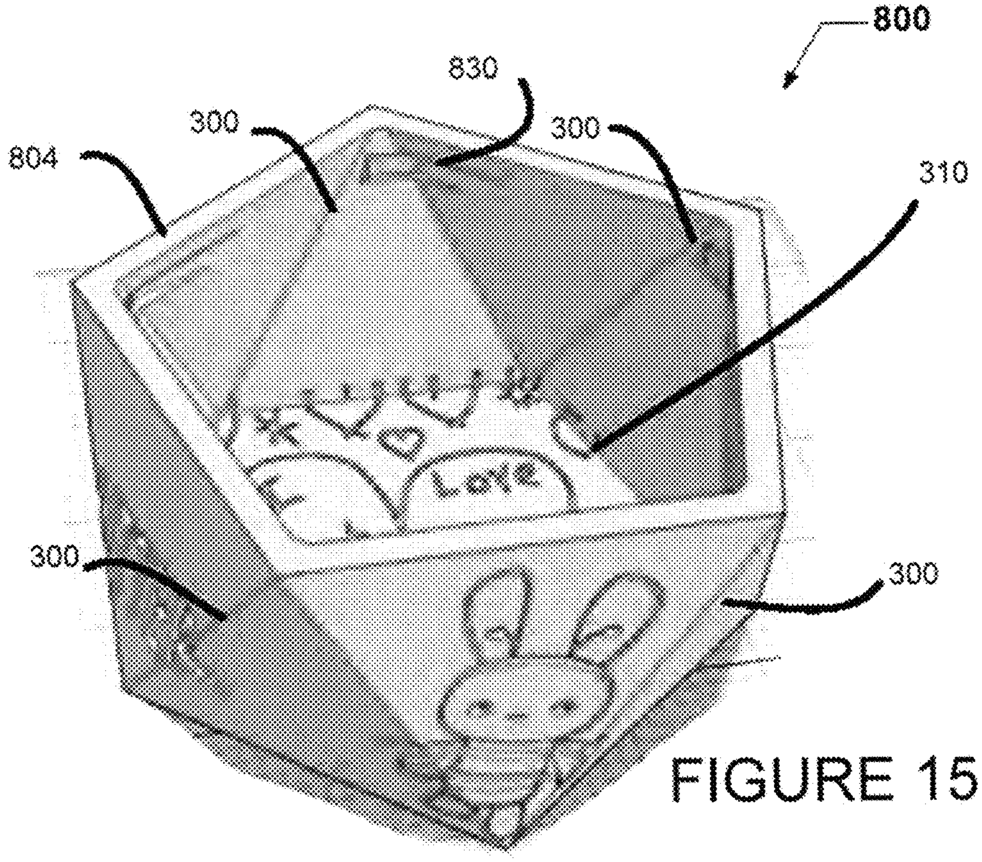
Figure 16:
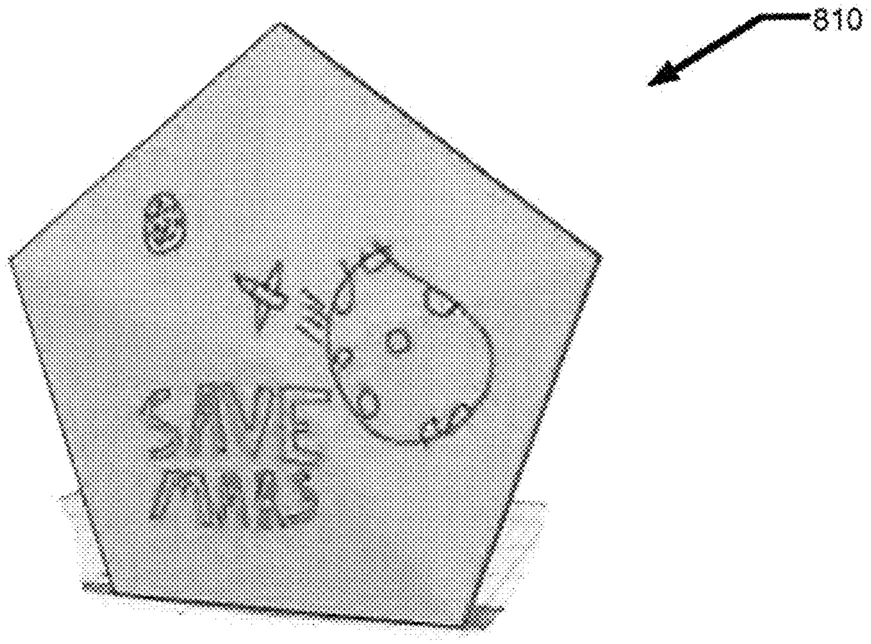
FIGS. 16 and 17 illustrate an alternative construction of a lid of the soap container of FIGS. 14 and 15 according to certain aspects of the present disclosure.

In an alternative construction according to the teachings of the present disclosure, the mold designs for the solid soap container includes "break-lines" indentations along the sidewalls thereof. Referring to FIGS. 14 and 15, break-lines indentations 300, 310 are strategically placed to allow a user to easily break apart the solid soap container 800 into useable pieces of soap after depleting the container's contents. In this construction, the soap container 800 may be separated into eight triangular pieces and a square bottom piece. Turning to FIGS. 14 and 15, the sidewall 802 of the container 800 may optionally include vertical break-line indentations 300 extending to the distal top 804. The bottom of the container 800 may include a bottom break-line indentation 310. The break-line indentation 310 may intersect with at least one of the vertical break-line indentations 300. This construction, including the container 800, creates nine separable useable pieces of soap product for use (eight triangular pieces from sidewalls and one piece from the bottom). In this example construction, composition 100, 100' can be biodegradable and the container 800 can be broken off and used as a soap product itself. In one advantage, because the entire container and its top 810 are made of soap, there is no solid waste to clogged the dumps or landfills. There are no metal or plastic levers to throwaway in the landfill. In one advantage, the container is 100% soap that is intended to be used up to prevent disposable in a landfill.

Figure 17:
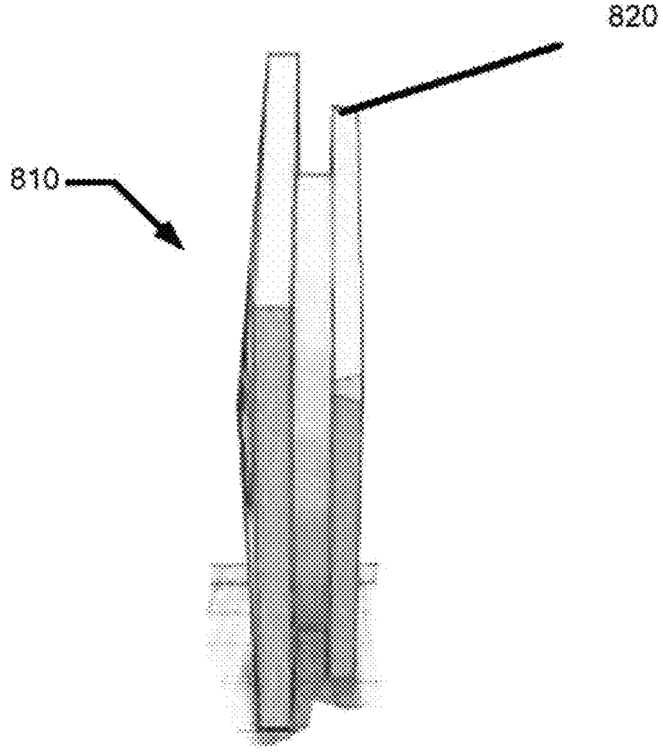

Referring FIG. 17, the container top 810 may include a male thread 820 to mate inside of the container body 806 with a corresponding indentation 830 to securely enclose the (e.g., lotions or semisolid cream inside container 800.

The term "semisolid" refers to a composition which, at room temperature, i.e. at a temperature of about 59° F. to 77° F., has the consistency of a cream, ointment or paste. Thus, a semisolid may not be free flowing in the same way as a liquid.

Although the compositions and methods of the present specification as well as various commercial and consumer products containing/comprising the same have been described with respect to specific embodiments and examples, it should be appreciated that the present teachings are not limited thereto and other embodiments utilizing the concepts expressed herein are intended and contemplated without departing from the scope of the present teaching as intended in the true spirit and scope of the invention. It is therefore intended any and all modifications, variations, or equivalents that fall within the spirit and scope of the underlying principles are within the scope of this present disclosure and are covered by the appended claims.

It should be noted the terms "including" and "comprising" should be interpreted as meaning "including, but not limited to".

In this specification, "a" and "an" and similar phrases are to be interpreted as "at least one" and "one or more." References to "the," "said," and similar phrases should be interpreted as "the at least one", "said at least one", etc. References to "an" embodiment in this disclosure are not necessarily to the same embodiment.

It is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A container made of a soap composition, the container comprising:

a container body including an outer sidewall extending from a bottom to a vertical height to form a distal open top, the outer sidewall enclosing a storage cavity exposed to a user of the container from the distal open top; and a container top configured to be removably and matingly engaged inside of the distal open top to enable access to the storage cavity, wherein the soap composition comprises coconut oil, sunflower oil, olive oil, sodium hydroxide, and distilled water.

2. The container according to claim 1, wherein a volume of the soap composition comprises about:

33 percent coconut oil;

20 percent sunflower oil;

13 percent olive oil;
10 percent sodium hydroxide; and
22 percent distilled water.

3. The container according to claim 1, wherein the outer sidewall of the container body includes vertical break-line indentations.

4. The container according to claim 3, wherein the outer sidewall of the container body includes a circumferential break-line indentation.

5. The container according to claim 4, wherein the circumferential break-line indentation intersects with at least one of the vertical break-line indentations.

6. The container according to claim 4, wherein the container body includes an inner sidewall having a circumferential indentation to receive a portion of the container top.

7. The container according to claim 1, wherein a volume of the soap composition comprises about:
41 parts coconut oil;
16 parts sunflower oil;
3 parts olive oil;
13 parts sodium hydroxide; and
27 parts distilled water.

8. A method of forming a container made of a soap composition, the method comprising:
mixing coconut oil, sunflower oil, olive oil, sodium hydroxide, and distilled water in a vessel to form the soap composition;
pouring, while in a substantially liquid form, the soap composition into:
a first mold for forming a container body of the container, the container body including an outer sidewall extending from a bottom to a vertical height to form a distal open top, the outer sidewall enclosing a storage cavity exposed to a user of the container from the distal open top; and
a second mold for a container top of the container, the container top configured to be removably and matingly engaged inside of the distal open top to enable access to the storage cavity;
cooling the soap composition in the first mold and the second mold; and
removing, when the soap composition is in a solid form, the container body and the container top from the first mold and the second mold, respectively.

9. The method according to claim 8, wherein a volume of the soap composition comprises about:
33 parts coconut oil;
20 parts sunflower oil;
13 parts olive oil;
10 parts sodium hydroxide; and
22 parts distilled water.

10. The method according to claim 8, wherein a volume of the soap composition comprises about:
41 parts coconut oil;
16 parts sunflower oil;
3 parts olive oil;
13 parts sodium hydroxide; and
27 parts distilled water.

11. The method according to claim 8, wherein the first mold is configured to form the outer sidewall of the container body to include vertical break-line indentations.

12. The method according to claim 11, wherein the first mold is configured to form the outer sidewall of the container body to include a circumferential break-line indentation.

13. The method according to claim 12, wherein the circumferential break-line indentation intersects with at least one of the vertical break-line indentations.

14. The method according to claim 12, wherein the vertical break-line indentations and the circumferential break-line indentation are configured to enable a user to break apart the container into useable portions of soap.

15. The container according to claim 4, wherein the vertical break-line indentations and the circumferential break-line indentation are configured to enable a user to break apart the container into useable portions of soap.

* * * * *